W. T. CARTER.
Harvester-Thrasher.
No. 209,652. Patented Nov. 5, 1878.
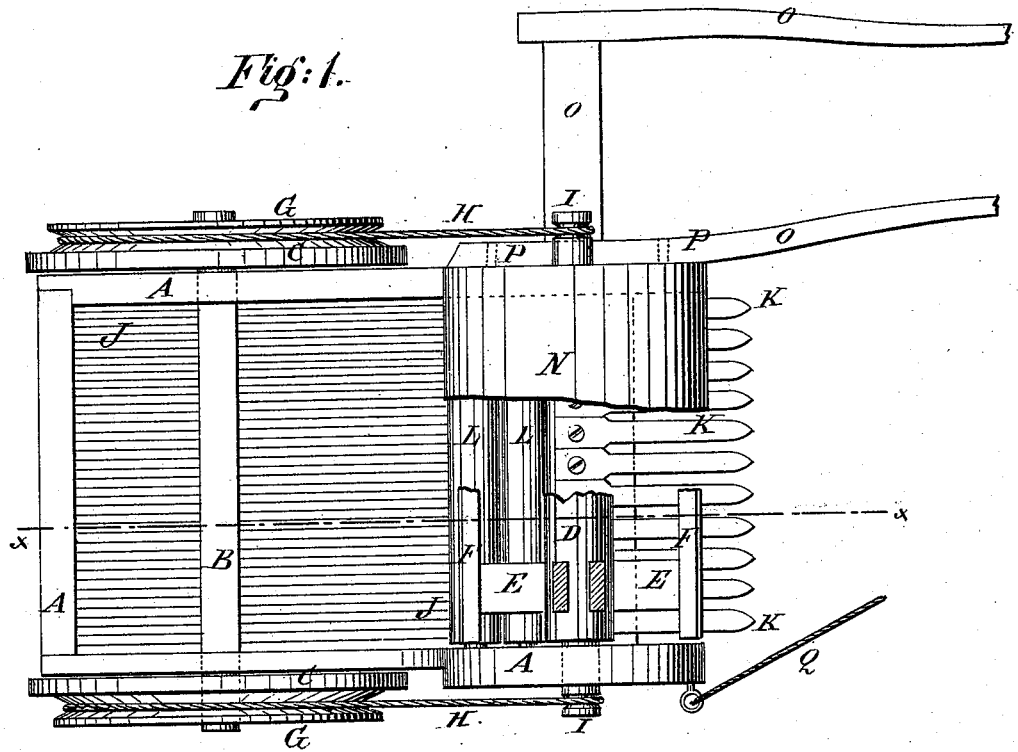
Fig: 1.
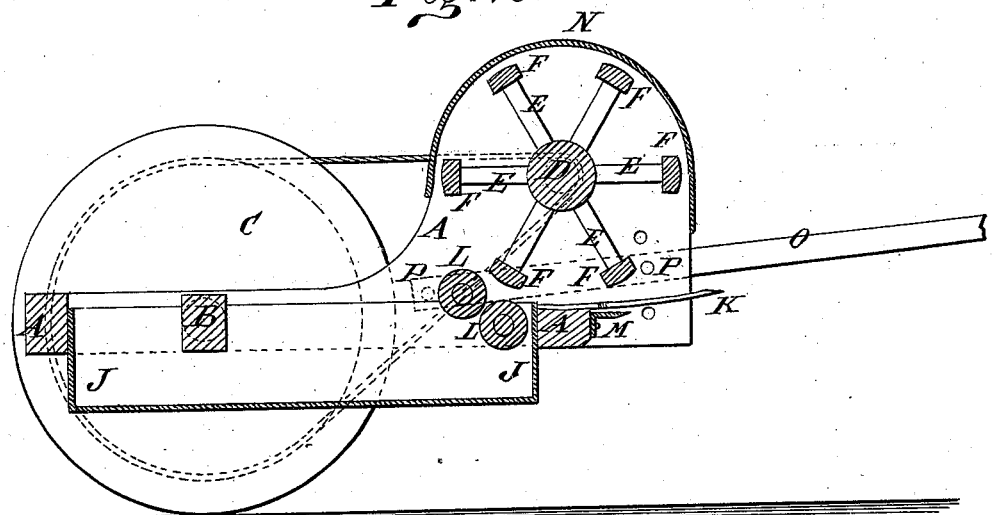
Fig: 2.
WITNESSES: Chas. Nida, C. Sedgwick
INVENTOR: W. T. Carter
BY Munn & Co.
ATTORNEYS.

UNITED STATES PATENT OFFICE.

WILLIAM T. CARTER, OF VILLAGE SPRINGS, ALABAMA.

IMPROVEMENT IN HARVESTER-THRASHERS.

Specification forming part of Letters Patent No. 209,652, dated November 5, 1878; application filed April 3, 1878.

*To all whom it may concern:*

Be it known that I, WILLIAM THOMSON CARTER, of Village Springs, in the county of Blount and State of Alabama, have invented a new and useful Improvement in Machines for Thrashing Standing Grain, of which the following is a specification:

Figure 1 is a top view of my improved machine, part being broken away to show the construction. Fig. 2 is a vertical longitudinal section of the same, taken through the line $x\ x$, Fig. 1.

Similar letters of reference indicate corresponding parts.

The object of this invention is to furnish a machine which shall be so constructed as to thrash the grain while standing in the field, and which shall be simple in construction, convenient in use, and effective in operation, harvesting the grain with less waste than when the grain is cut and harvested in the usual way.

A is the frame of the machine, which is attached to the axle B. Upon the journals of the axle B revolve the wheels C, to the outer sides of which are attached, or upon them are formed, pulleys G, around which pass the bands H. The bands H also pass around pulleys I, formed upon or attached to the ends of the shaft D, which revolves in the upwardly-extended forward parts of the sides of the box J or frame A. To the shaft D are attached a number of pairs of arms, E, to the outer ends of which are attached cross-bars F, to serve as beaters to thrash the grain. To the forward cross-bar of the frame A are attached a number of fingers, K, the space between said fingers being wide enough to receive the stalks of the grain. Journaled in the sides of the box J, at the front end thereof, are two rollers, L, which are arranged one above and partly behind the other and beneath the beaters, so as to form a concave, in conjunction with which the beaters F operate to thrash out the grain as it passes between the concave rollers and beaters, the movement of the surfaces of the rollers serving to prevent the grain from being mashed.

To the front cross-bar of the frame A, just below the fingers K, is attached a knife, M, to cut off anything that might clog the said fingers K. The forward part of the machine is covered with a casing, N, to prevent the grain from scattering while being thrashed.

O are the shafts, the inner one of which is secured to the side of the forward end of the box J by two bolts, P, several holes being formed in the box J to receive the forward bolt, P, so that the fingers K can be adjusted higher or lower, as the height of the grain may require. To the other side of the forward end of the box J is attached the end of a rope or chain, Q, the other end of which is attached to the hames of the horse, to prevent any side draft of the machine.

Having thus described my invention, I claim as new and desire to secure by Letters Patent—

The harvester-thrasher herein described, consisting essentially of the rotary beater D E F, fingers K, cutter M, rollers L L, arranged beneath the beaters, box J, and casing N, the whole mounted on wheels, and combined and arranged for operation as specified.

WILLIAM THOMSON CARTER.

Witnesses:
HENRY F. WOOD,
JAMES B. WOOD.